US008600073B2

(12) United States Patent
Sun

(10) Patent No.: US 8,600,073 B2
(45) Date of Patent: Dec. 3, 2013

(54) WIND NOISE SUPPRESSION

(75) Inventor: Xuejing Sun, Rochester Hills, MI (US)

(73) Assignee: Cambridge Silicon Radio Limited, Cambridge (GB)

( * ) Notice: Subject to any disclaimer, the term of this patent is extended or adjusted under 35 U.S.C. 154(b) by 942 days.

(21) Appl. No.: 12/612,505

(22) Filed: Nov. 4, 2009

(65) Prior Publication Data

US 2011/0103615 A1 May 5, 2011

(51) Int. Cl.
*G10L 21/0208* (2013.01)
*G10L 15/20* (2006.01)

(52) U.S. Cl.
USPC ........ 381/94.3; 381/94.1; 381/94.2; 704/226; 704/233

(58) Field of Classification Search
USPC ........ 381/94.1, 94.2, 94.3, 98, 94.9; 704/233, 704/226
See application file for complete search history.

(56) References Cited

U.S. PATENT DOCUMENTS

2004/0165736 A1 8/2004 Hetherington et al.
2004/0167777 A1 8/2004 Hetherington et al.
2007/0030989 A1 2/2007 Kates
2008/0069373 A1* 3/2008 Jiang et al. .................. 381/94.1
2008/0317261 A1* 12/2008 Yoshida et al. ............. 381/94.1
2010/0082339 A1* 4/2010 Konchitsky et al. .......... 704/226

FOREIGN PATENT DOCUMENTS

WO 2007/132176 A1 11/2007

OTHER PUBLICATIONS

King et al., "Coherent Modulation Comb Filtering for Enhancing Speech in Wind Noise," Proceedings of IWAENC, 2008.
Schmidt et al., "Wind Noise Reduction Using Non-Negative Sparse Coding," IEEE International Workshop on Machine Learning for Signal Processing, 2007.

* cited by examiner

*Primary Examiner* — Duc Nguyen
*Assistant Examiner* — George Monikang
(74) *Attorney, Agent, or Firm* — Frommer Lawrence & Haug LLP; John W. Branch

(57) ABSTRACT

A method of suppressing wind noise in a voice signal determines an upper frequency limit that lies within the frequency spectrum of the voice signal, and for each of a plurality of frequency bands below the upper frequency limit, compares the average power of signal components in a first portion of the signal to the average power of signal components in a second portion of the signal, where the second portion is successive to the first portion. Signal components are identified in at least one of the plurality of frequency bands as containing impulsive wind noise in dependence on the comparison, and the identified signal components are attenuated.

21 Claims, 5 Drawing Sheets

WIND NOISE SUPPRESSION

FIELD OF THE INVENTION

This invention relates to a method and apparatus for suppressing wind noise in a voice signal, and in particular to reducing the algorithmic complexity associated with such a suppression.

BACKGROUND OF THE INVENTION

Local pressure fluctuations caused by the action of turbulent air flow (i.e. wind) across the surface of a microphone are picked up by the microphone in addition to a wanted signal, and manifest as noise in the signal output from the microphone. Time-varying noise created under such conditions is commonly referred to as wind noise or wind "buffet" noise. Wind noise in embedded microphones, such as those found in mobile phones, Bluetooth handsets and hearing aids, interferes with a wanted acoustic signal causing the quality of the acoustic signal to be severely degraded. In severe cases, wind noise is sufficient to saturate the microphone which prevents the microphone from being able to pick up the wanted signal. Wind noise may be impulsive or non-impulsive. Impulsive wind noise is highly transient and may be audible as, for example, pops and clicks. Non-impulsive wind noise is less transient than impulsive wind noise.

Mechanical approaches to mitigating the problem of wind noise have been proposed, for example the use of fairing, open cell foam, shells around the microphone and multiple omni-directional electro-acoustic transducers in the microphone. However, such approaches are not practical or feasible for many small-scale applications.

Software based approaches have also been proposed. For example, US Pub. No. 2007/0030989 describes an approach to detecting wind noise in a signal by comparing to a threshold the ratio of the input signal power at frequencies below a predetermined frequency (typically occupied by wind noise) to the total input signal power. If the threshold is exceeded then wind noise is determined to be present in the signal. The wind noise is then suppressed by attenuating the signal in predetermined frequency bands. Although this method is efficient, the use of the predetermined frequency and the attenuation of the signal in predetermined frequency bands means that it is not adaptable to differing wind conditions. For example, the power-frequency spectrum of wind noise becomes flatter at higher wind speeds. Hence only relying on the proportion of the signal power in frequency bands below a predetermined frequency is unlikely to detect wind noise at all wind speeds. In practice, wind noise acquired by mobile devices rarely remains in a constant spectral pattern, which could render this method ineffective.

Complicated software approaches have been proposed which specifically detect wind noise. For example, US Pub. No. 2004/0165736 describes a three step approach to detecting wind noise. Firstly, transient signals are detected in a voice signal when the average power of the voice signal exceeds the average power of the background noise by more than a predetermined threshold. These transient signals could be impulsive wind noise, or instances of the wanted voice signal. Secondly, if a transient signal is detected then a spectrogram of the voice signal is scanned for spectral patterns typical of wind noise. This involves fitting a straight line to the low-frequency portion of the spectrum and comparing the gradient of the line, and the y-intersect with threshold values. Thirdly, if wind noise is detected, then the transient signal is analysed to discriminate between instances of wanted signal and instances of wind noise. This involves further spectral analysis of the peaks of the transient signal, and comparison of these peaks to those previously processed. Frequencies dominated by wind noise are then attenuated.

Although effective, software based approaches require high levels of processing power, often due in part to the use of complex modelling. Such approaches are unsuitable for low-power embedded platforms which process voice signals in real time.

There is therefore a need to provide an apparatus capable of suppressing wind noise in a voice signal picked up by a microphone, using a process that is low in computational complexity. Additionally, there is a need to provide an apparatus that is able to more effectively suppress wind noise at different wind speeds.

SUMMARY OF THE INVENTION

According to a first aspect of the present invention, there is provided a method of suppressing wind noise in a voice signal comprising: determining an upper frequency limit that lies within the frequency spectrum of the voice signal; for each of a plurality of frequency bands below the upper frequency limit, comparing the average power of signal components in a first portion of the signal to the average power of signal components in a second portion of the signal, the second portion being successive to the first portion; identifying signal components in at least one of the plurality of frequency bands as comprising impulsive wind noise in dependence on the comparison; and attenuating the identified signal components.

Suitably, the method comprises determining the upper frequency limit such that a predetermined proportion of the signal power is below the upper frequency limit.

Suitably, the predetermined proportion is selected such that the upper frequency limit is indicative of whether the signal comprises wind noise.

Suitably, the method further comprises identifying whether the voice signal comprises wind noise in dependence on at least one criterion, and only performing the comparing, identifying signal components and attenuating steps if wind noise is identified.

Suitably, the method further comprises estimating a harmonicity of the voice signal, wherein a first criterion of the at least one criterion is the estimated harmonicity, wherein the harmonicity being lower than a first threshold is indicative of the voice signal comprising wind noise.

Suitably, a second criterion of the at least one criterion is the determined upper frequency limit, wherein the upper frequency limit being lower than a second threshold is indicative of the voice signal comprising wind noise.

Suitably, the method comprises: comparing the average power of signal components in the first portion and the average power of signal components in the second portion so as to determine a probability distribution of the temporal variation of the signal as a function of frequency; and identifying signal components as comprising impulsive wind noise in dependence on the probability distribution.

According to a second aspect of the present invention, there is provided a method of suppressing wind noise in a voice signal, the voice signal comprising signal components in a plurality of frequency bands, the method comprising: for each frequency band, comparing the power of signal components in the frequency band to an estimated background noise power in that frequency band so as to determine a speech absence probability for that frequency band; comparing at least one of the speech absence probabilities to a first threshold so as to determine a first value indicative of whether the signal comprises wind noise and speech; comparing at least one of the speech absence probabilities to a second threshold so as to determine a second value indicative of whether the signal comprises voiced speech; and applying a respective gain factor to each frequency band in dependence on the first value and the second value.

Suitably, the method comprises: selecting the smallest determined speech absence probability from a subset of the determined speech absence probabilities; comparing the smallest determined speech absence probability to the first threshold; and determining the first value to indicate that the signal comprises wind noise and speech if the smallest determined speech absence probability is less than the first threshold.

Suitably, the method comprises selecting the largest determined speech absence probability from a subset of the determined speech absence probabilities; comparing the largest determined speech absence probability to the second threshold; and determining the second value to indicate that the signal comprises voiced speech if the largest determined speech absence probability is greater than the second threshold.

Suitably, the method further comprises determining the second value to indicate that the signal comprises unvoiced speech if the largest determined speech absence probability is lower than the second threshold.

Suitably, the method further comprises: determining an upper frequency limit that lies within the frequency spectrum of the voice signal; and selecting the respective gain factor to apply to each frequency band in dependence on whether the frequency band is below the upper frequency limit.

Suitably, the method comprises determining the upper frequency limit such that a predetermined proportion of the signal power is below the upper frequency limit.

Suitably, the method comprises, if the upper frequency limit is below a third threshold, only determining a speech absence probability for each frequency band above the upper frequency limit.

Suitably, the method further comprises prior to determining the speech absence probabilities: for each of a plurality of frequency bands below the upper frequency limit, comparing the average power of signal components in a first portion of the signal to the average power of signal components in a second portion of the signal, the second portion being successive to the first portion; and identifying the absence of impulsive wind noise in signal components in the plurality of frequency bands in dependence on the comparison.

Suitably, the method further comprises identifying whether the voice signal comprises wind noise in dependence on at least one criterion, and only determining a speech absence probability for each frequency band if wind noise is identified.

Suitably, the method further comprises estimating a harmonicity of the voice signal, wherein a first criterion of the at least one criterion is the estimated harmonicity, wherein the harmonicity being lower than a first threshold is indicative of the voice signal comprising wind noise.

Suitably, a second criterion of the at least one criterion is the determined upper frequency limit, wherein the upper frequency limit being lower than a second threshold is indicative of the voice signal comprising wind noise.

According to a third aspect of the present invention, there is provided an apparatus configured to suppress wind noise in a voice signal comprising: a determination module configured to determine an upper frequency limit that lies within the frequency spectrum of the voice signal; a comparison module configured to, for each of a plurality of frequency bands below the upper frequency limit, compare the average power of signal components in a first portion of the signal to the average power of signal components in a second portion of the signal, the second portion being successive to the first portion; an identification module configured to identify signal components in at least one of the plurality of frequency bands as comprising impulsive wind noise in dependence on the comparison; and a gain module configured to attenuate the identified signal components.

Suitably, the apparatus further comprises a harmonicity estimation module configured to estimate a harmonicity of the voice signal.

Suitably, the apparatus further comprises a speech absence probability module configured to, for each frequency band, compare the power of signal components in the frequency band to an estimated background noise power in that frequency band so as to determine a speech absence probability for that frequency band.

Suitably, the comparison module is further configured to: compare at least one of the speech absence probabilities to a first threshold so as to determine a first value indicative of whether the signal comprises wind noise and speech; and compare at least one of the speech absence probabilities to a second threshold so as to determine a second value indicative of whether the signal comprises voiced speech; the gain module being further configured to apply a gain factor to each frequency band in dependence on the first and second values.

According to a fourth aspect of the present invention, there is provided a method of suppressing wind noise in a voice signal comprising: determining an upper frequency limit such that a predetermined proportion of the signal power is below the upper frequency limit; identifying the voice signal as comprising wind noise if the upper frequency limit is less than a threshold; and if the voice signal is identified as comprising wind noise, applying greater attenuation factors to signal components of the voice signal having frequencies below the upper frequency limit than signal components of the voice signal having frequencies above the upper frequency limit.

BRIEF DESCRIPTION OF THE DRAWINGS

The present invention will now be described by way of example with reference to the accompanying drawings, in which.

DETAILED DESCRIPTION OF THE INVENTION

A preferred embodiment of a wind noise mitigation method is described in the following with reference to the flow chart of FIG. 1.

In operation, signals are processed by the apparatus described in discrete temporal parts. The following description refers to processing portions of a signal. These portions may be packets, frames or any other suitable sections of a signal. These portions are generally of the order of a few milliseconds in length.

Figure 1:
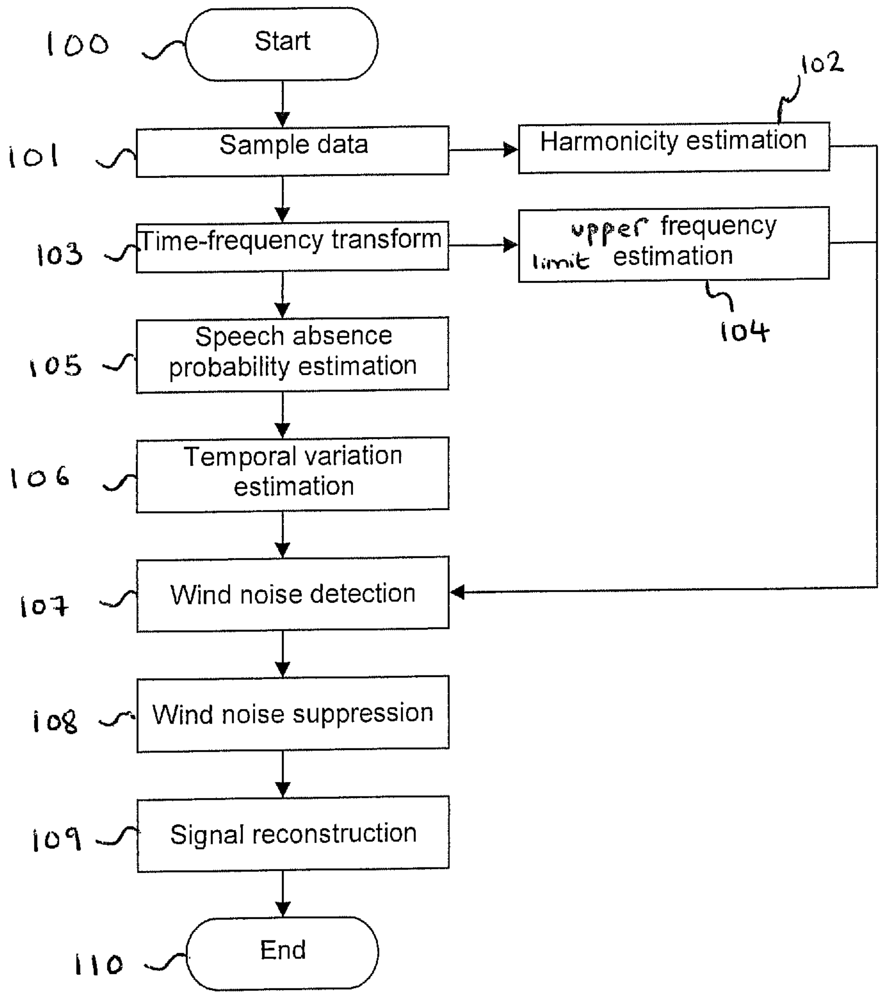
FIG. 1 is a flow diagram of a wind noise mitigation method according to the present disclosure.

At step 100 of FIG. 1 a voice signal is input to the processing apparatus. Typically, this voice signal has been picked up by a microphone of the apparatus. In conditions of ambient wind, the microphone picks up wind noise. The voice signal therefore comprises wanted voice signal components and unwanted wind noise signal components. At step 101 the voice signal is sampled. The sampled data is assembled into portions, each portion consisting of the same number of samples. Suitably, each portion is a short-term signal, for example consisting of 256 samples at an 8 kHz sampling rate. Preferably, the remaining steps of FIG. 1 are performed on each portion of the signal individually. Alternatively, one or more of the following steps may be performed periodically, whilst other of the steps are performed on each portion. For example, the harmonicity and roll-off frequency may be performed periodically, whilst the speech absence probability estimation and temporal variation estimation are performed on each portion. Periodically is used herein to mean once every few portions.

At step 102 the harmonicity (also called periodicity) of a portion of the voice signal is estimated. When viewed over short time scales, voiced speech signals appear to be substantially periodic, i.e. consist of substantially repeating segments. On the other hand, wind noise is highly non-periodic. The harmonicity of a signal is a measure of the extent to which the signal is periodic, i.e. formed of repeating segments. In this method, the harmonicity is an indication of the degree of voiced speech versus non-periodic noise in the signal.

There are numerous well known algorithms commonly used in the art to detect the harmonicity of a signal. Examples of metrics utilised by these algorithms are normalised cross-correlation (NCC), average squared difference function (ASDF), and average magnitude difference function (AMDF). Algorithms utilising these metrics offer similar harmonicity detection performance. The selection of one algorithm over another may depend on the efficiency of the algorithm, which in turn may depend on the hardware platform being used.

To illustrate the method described herein, an average magnitude difference function (AMDF) metric will be used. However, the method is equally suitable for use with other metrics such as those mentioned above.

For a short-term signal x[n] {n:0 . . . N−1}, the AMDF metric can be expressed mathematically as:

$$AMDF_m[\tau] = \frac{1}{L}\sum_{n=m-L+1}^{m} |x[n] - x[n-\tau]| \qquad \text{(equation 1)}$$

where x is the amplitude of the voice signal and n is the time index. The equation represents a correlation between two segments of the voice signal which are separated by a time $\tau$. Each of the two segments is split up into L time samples. The absolute magnitude difference between the nth sample of the first segment and the respective nth sample of the other segment is computed. The number of samples, L, used in the AMDF metric lies in the range 0<L<N, where N is the number of samples in the portion of the signal being analysed. m is the time instant at the end of the portion being analysed. Alternatively, the AMDF metric may be used to determine the correlation between a segment in the current portion of the signal, and segments in previous or future portions of the signal.

Equation 1 is repeated over time separations incremented over the range $\tau_{min} \leq \tau < \tau_{max}$. The aim of the method is to take a first segment of a signal and correlate it with each of a number of further segments of the signal. Each of these further segments lags the first segment along the time axis by a lag value in the range $\tau_{min}$ to $\tau_{max}$. The method results in an AMDF value for each $\tau$ value.

The harmonicity can be expressed as 1 minus the ratio between the minimum of the AMDF function and the maximum of the AMDF function. Mathematically:

$$H = 1 - \frac{\min(AMDF_m[\tau])}{\max(AMDF_m[\tau])} \qquad \text{(equation 2)}$$

A harmonicity value close to 1 indicates that there is a high proportion of voiced speech in the voice signal. This is because a voiced speech signal is quasi-periodic. The difference between the minimum and maximum AMDF values is therefore large (although not as large as for a pure tone which is exactly periodic).

A harmonicity value close to 0 indicates that there is a high proportion of unvoiced speech or non-periodic noise in the voice signal. This is because these features are highly non-periodic. The difference between the minimum AMDF and maximum AMDF is therefore small.

Figure 2A:
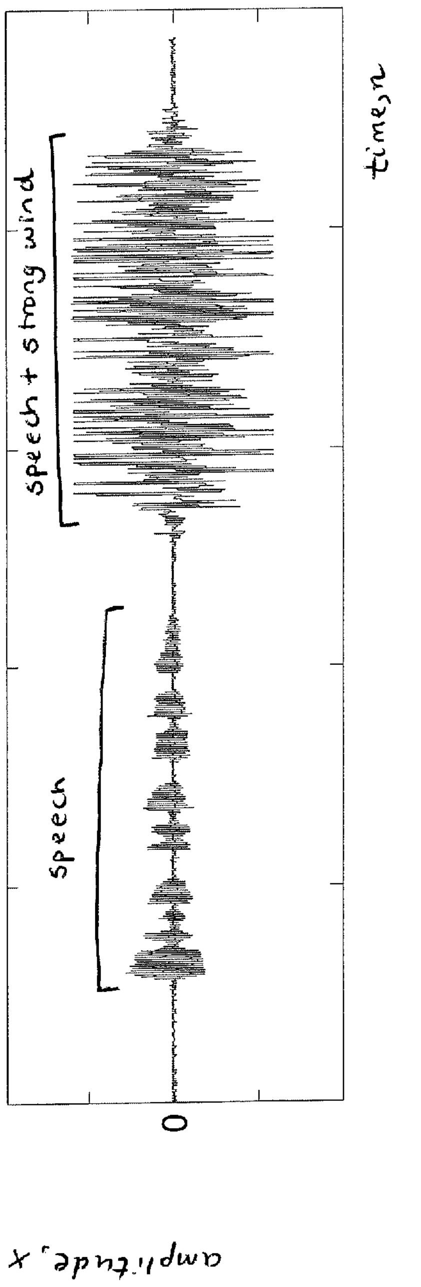
FIG. 2*a* illustrates a graph of a typical voiced speech signal.
Figure 2B:
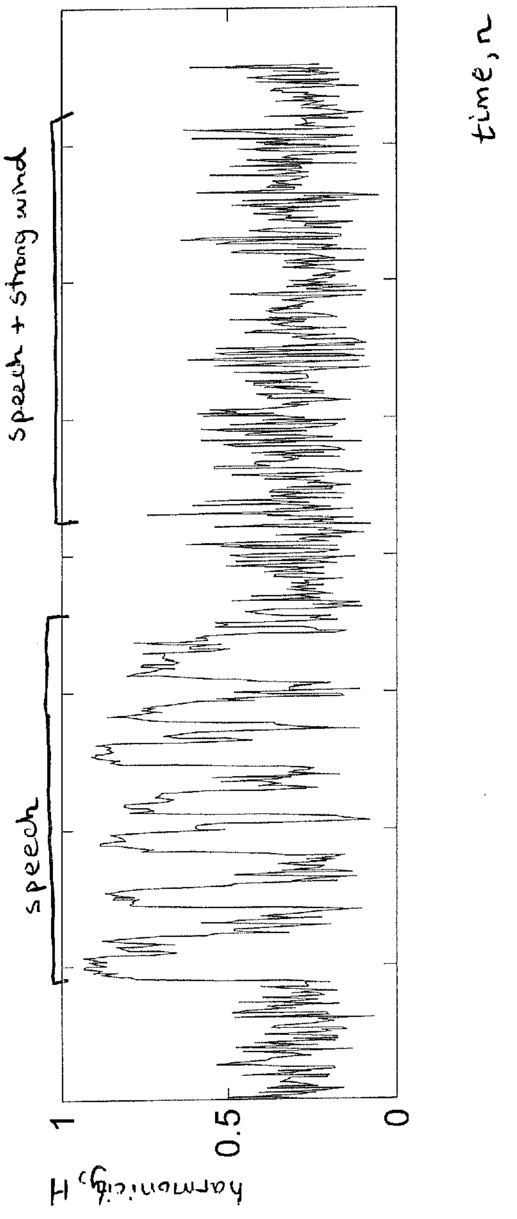
FIG. 2*b* illustrates a graph of the harmonicity of the signal of FIG. 2*a;*

FIGS. 2*a* and 2*b* illustrate the use of harmonicity estimation in detecting the degree of voiced speech versus non-periodic noise in a signal.

FIG. 2*a* is a graph of the amplitude of a voice signal plotted against time. The first part of the voice signal is clean voiced speech, i.e. speech in the presence of minimal noise. This part is marked as ‘speech’ on FIG. 2*a*. The second part of the voice signal is speech in the presence of strong wind noise. This part is marked as ‘speech+strong wind’ on FIG. 2*a*.

FIG. 2*b* is a graph of the corresponding harmonicity of the voice signal of FIG. 2*a* plotted against time. FIG. 2*b* shows that clean voiced speech exhibits high harmonicity values. Typically these values exceed 0.5. By comparison, voiced speech in the presence of strong wind exhibits lower harmonicity values. Typically these values are lower than 0.5.

Returning to FIG. 1, the remaining analytical steps of the method process the voice signal in the frequency domain. Consequently, at step 103 a time-frequency transformation is applied to the portion of the voice signal being analysed. This may be performed by any suitable method. For example, a discrete Fourier transform filter bank may be employed.

The remaining analytical steps involve determining an upper frequency limit for the portion, estimating the speech absence probability of the portion, and estimating the temporal variation of the portion. The order of the steps shown in the figure is for illustrative purposes only. These steps may be performed in any order.

At step 104, an upper frequency limit of the portion of the voice signal is estimated. The upper frequency limit is indicative of the presence of wind noise in the signal. The upper frequency limit is also used in the following processing of the signal. The upper frequency limit lies within the frequency spectrum of the voice signal.

Suitably, the upper frequency limit is the roll-off frequency of the portion of the voice signal. The roll-off frequency is the frequency below which a predetermined proportion of the signal power in the portion is contained. Most of the energy of wind noise (and in particular impulsive wind noise) is concentrated at low frequencies. The roll-off frequency is suitable for identifying whether there is a high proportion of wind noise in the voice signal because, for a suitably selected predetermined proportion, a low roll-off frequency is expected if the voice signal is dominated by wind noise, whereas a higher roll-off frequency is expected if the voice signal is dominated by speech.

Denoting the amplitude spectrum by a(f), the roll-off frequency is mathematically expressed as:

$$\sum_{0}^{fc} a^2(f) = c\sum_{0}^{sr/2} a^2(f) \qquad \text{(equation 3)}$$

where c is the predetermined proportion, sr is the sampling frequency, and fc is the roll-off frequency. The maximum frequency is half the sampling frequency in line with the Nyquist sampling theorem.

The choice of the predetermined proportion c is implementation dependent. Suitably, the predetermined proportion is sufficiently high that the upper frequency limit is indicative of whether the portion comprises significant wind noise. Suitably, c is greater than 0.9.

At step 105, speech absence probabilities of the portion of the voice signal are estimated. In determining the speech absence probabilities, the portion is processed in a plurality of frequency bands. A speech absence probability is determined for each frequency band. A speech absence probability for a frequency band is determined by comparing the average power of signal components in that frequency band to the estimated average background noise power in that frequency band.

Suitably, the speech absence probability is determined according to the following equation:

$$q_k(l) = \begin{cases} \frac{|D_k(l)|^2}{P_k(l)}\exp\left(1 - \frac{|D_k(l)|^2}{P_k(l)}\right), & \text{if } |D_k(l)|^2 > P_k(l) \\ 1, & \text{otherwise} \end{cases} \qquad \text{(equation 4)}$$

where $D_k(l)$ denotes the amplitude of the voice signal in frequency band k of portion l, $P_k(l)$ denotes the noise power in the voice signal in frequency band k of portion l, and $q_k(l)$ denotes the speech absence probability in frequency band k of portion l.

If the noise power is greater or the same as the voice signal power, then the voice signal only includes noise, and hence the speech absence probability is selected to be 1.

If the signal power is greater than the noise power, then a speech absence probability is the product of two terms. The first term is the ratio of the voice signal power to the noise power. The second term is the exponential of 1 minus the ratio of the voice signal power to the noise power.

The speech absence probability is a value between 0 and 1. If the input voice signal power is significantly higher than the noise estimate, then the speech absence probability approaches zero indicating a possible speech event. On the other hand, a higher probability value indicates that the input voice signal power has a similar power to the noise floor and thus does not contain speech.

Any suitable algorithm can be used to estimate the average background noise power. Suitably, the background noise power is estimated from the input voice signal $D_k(l)$ using the following recursive relation.

$$P_k(l)=P_k(l-1)+\alpha\cdot q_k(l)\cdot(|D_k(l)|^2-P_k(l-1)) \qquad \text{(equation 5)}$$

where $\alpha$ is a constant between 0 and 1, and the remaining terms are defined as in equation 4.

Equation 5 defines the noise power in a frequency band k of a portion l to be a weighted sum of two terms. The first term is the noise power in the same frequency band of the previous portion, $P_k(l-1)$. The second term is the product of the speech absence probability in the same frequency band in the same portion $q_k(l)$, and the difference between the power of the signal components in the same frequency band of the same portion $D_k(l)^2$ and the noise power in the same frequency band of the previous portion $P_k(l-1)$. $\alpha$ sets the weight to be applied to the second term of the sum relative to the first term, i.e. the weight to be applied to the components of the current portion compared to the components of previous portions. $P_k(l)$ represents a running average of the background noise power, where the value of $\alpha$ determines the effective averaging time. If $\alpha$ is large then more weight is applied to the signal components of the current portion, i.e. the averaging time is short. If $\alpha$ is small then more weight is applied to previous portions, i.e. the averaging time is long.

The background noise power is a measure of the quasi-stationary noise power. This does not include non-stationary noise components such as wind noise.

At step 106, temporal variations associated with the portion of the signal are estimated. A temporal variation is a measure of the energy fluctuation between adjacent portions of the signal. The temporal variation determination is used to identify whether the signal comprises impulsive wind noise. Impulsive wind noise is short in duration compared to other types of noise, and higher in energy than other types of noise. In the frequency domain, the energy of impulsive wind noise generally spreads evenly (following removal of an overall spectral slope) across the frequencies it occupies. The energy of speech, on the other hand, has a large spectral variation. Consequently, a signal portion dominated by impulsive wind noise exhibits significantly higher energy across almost all frequencies compared to a previous signal portion dominated by speech.

As with determining the speech absence probabilities, each portion is processed in a plurality of frequency bands in determining the temporal variations. A temporal variation is determined for each frequency band. Since the impulsive wind noise only occupies low frequencies, only temporal variations of frequency bands below the upper frequency limit are determined. The average power of signal components in each frequency band of the portion is compared to the average power of signal components in the corresponding frequency band of an adjacent portion. The adjacent portion may either be the preceding portion or the following portion in the data stream. Preferably, the adjacent portion is the preceding portion in the data stream.

Suitably, the temporal variation is determined according to the following equation:

$$v_k(l) = \begin{cases} 0, & \text{if } |D_k(l)|^2 \le D_k(l-1)^2 \\ 1 - \frac{|D_k(l)|^2}{|D_k(l-1)|^2}\exp\left(1 - \frac{|D_k(l)|^2}{|D_k(l-1)|^2}\right), & \text{otherwise} \end{cases} \qquad \text{(equation 6)}$$

where $v_k(l)$ denotes the temporal variation of the voice signal in frequency band k of portion l, $D_k(l)$ denotes the amplitude of the voice signal in frequency band k of portion l, and $D_k(l-1)$ denotes the amplitude of the voice signal in frequency band k of portion l−1.

An impulsive wind buffet is characterised by the sudden onset of increased energy. Consequently, if the signal power of the current portion is less than or the same as the signal power of the previous portion, the temporal variation is chosen to be 0 indicating that the current portion does not comprise an impulsive wind buffet.

If the signal power of the current portion is greater than the signal power of the previous portion, then the temporal variation of a frequency band of the current portion is 1 minus the product of two terms. The first term is the ratio of the signal power in the frequency band of the current portion to the signal power in the frequency band of the preceding portion. Each signal power is computed by determining the average power of the signal components in the frequency band of the respective portion. The second term is the exponential of 1 minus the ratio of the signal power in the frequency band of the current portion to the signal power in the frequency band of the preceding portion.

The temporal variation is a value between 0 and 1. If the signal power in the frequency band of the adjacent portions is similar, then the temporal variation is close to 0 indicating that there is no impulsive wind noise. If the signal power in the frequency band of the current portion is much greater than the signal power in the previous portion, then the temporal variation is close to 1 indicating the presence of an impulsive wind buffet in the current portion.

At step 107, the method uses the results of the harmonicity estimation, upper frequency limit estimation, speech absence probability estimation, and temporal variation estimation to determine if the signal includes clean speech, or impulsive wind noise, or non-impulsive wind noise, or a mixture of non-impulsive wind noise and either voiced speech or unvoiced speech.

At step 108, the detected wind noise, if present, is suppressed by applying gain factors to signal components in the portion. Suitably, frequency dependent gain factors are applied to the signal components. This can be expressed mathematically as:

$$\hat{S}_k(l)=G_k(l)\cdot D_k(l) \quad \text{(equation 7)}$$

where $G_k(l)$ denotes the gain factor in frequency band k of portion l, $D_k(l)$ denotes the amplitude of the voice signal in frequency band k of portion l, and $S_k(l)$ denotes the amplitude of the voice signal in frequency band k of portion l after the gain factor has been applied.

Suitably, factors with greater attenuation values are applied to signal components in frequency bands determined to be dominated by wind noise, and factors with minimal or smaller attention values are applied to signal components in frequency bands determined to be dominated by speech. In other words, for gain values in the range [0,1], gain values closer to 0 are applied to signal components in frequency bands dominated by wind noise compared to gain values applied to signal components in frequency bands dominated by speech. The values of the gain factors are chosen in dependence on the type of wind noise detected to be present in the signal.

Suitably, the gain values are smoothed before being applied to the voice signal.

At step 109, the voice signal is reconstructed. This involves combining the signal components in the different frequency bands after their respective gain factors have been applied to them. Signal reconstruction may also involve reconstructing degraded or lost portions of the signal, for example by replacing them with other error-free portions of the signal.

In the method described above, the speech absence probabilities and temporal variation are determined for each frequency band separately. In conditions of spurious power fluctuations, this can yield anomalous results. Suitably, to improve robustness in such conditions, the power ratios $$\frac{|D_k(l)|^2}{P_k(l)} \text{ and } \frac{|D_k(l)|^2}{|D_k(l-1)|^2}$$

are determined by initially summing the power of the signal components over several frequency bands.

Example Implementation

Figure 3:
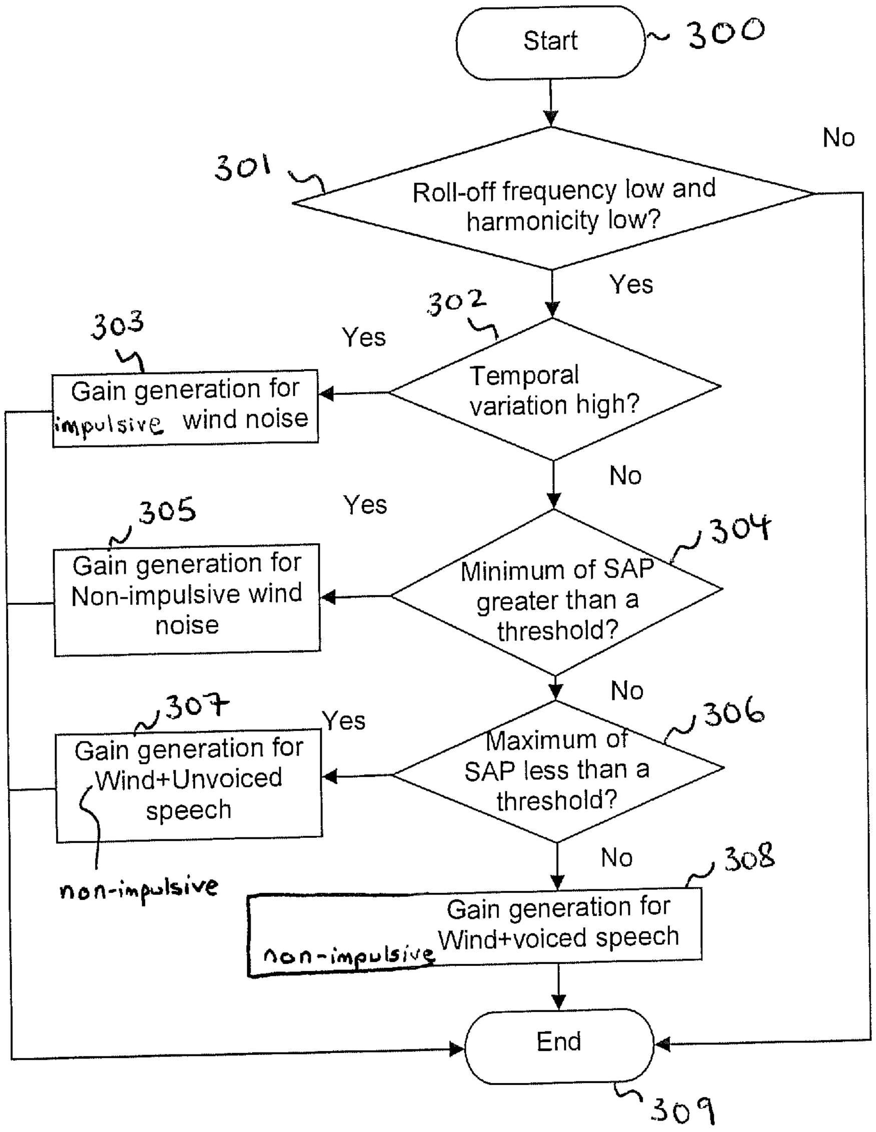
FIG. 3 is a flow diagram of an example implementation of a wind suppression method.

An example implementation of the use of the harmonicity, roll-off frequency, temporal variation and speech absence probability will now be described with reference to the flow diagram of FIG. 3. The method illustrated in FIG. 3 categorises each portion of a voice signal as including signal components in one of the following four categories:

1. impulsive wind noise
2. non-impulsive wind noise
3. non-impulsive wind noise and voiced speech
4. non-impulsive wind noise and unvoiced speech At step 300 a portion of sampled voice signal is input to the processing apparatus. At step 301 the portion is analysed to identify whether it comprises wind noise. This analysis is performed either by measuring the roll-off frequency, or by measuring the harmonicity, or by measuring the roll-off frequency and harmonicity of the signal. The roll-off frequency and/or harmonicity are measured as previously described. If the harmonicity is estimated to be lower than a threshold, this is taken to be indicative of the portion comprising wind noise. Suitably, this threshold is 0.45. If the roll-off frequency is determined to be lower than a threshold, this is taken to be indicative of the portion comprising wind noise. Suitably, this threshold is 1600 Hz.

If the harmonicity and/or roll-off frequency indicate that the portion does not comprise wind noise, then the method does not perform any further wind noise analysis of the portion, but instead skips to step 309 where the portion is output for further processing. In this case, no additional attenuation is applied to signal components of the portion by the method described herein.

If the harmonicity and/or roll-off frequency indicate that the portion comprises wind noise, then the method progresses to step 302 at which the temporal variation of the portion is measured.

If wind noise is identified in the portion in dependence on both the harmonicity and the roll-off frequency, and these two measures indicate different states, i.e. one of the measures indicates that wind noise is present and the other indicates that wind noise is not present, then the algorithm may prioritise the finding of one measure. Alternatively, a soft decision may be made in dependence on the actual values of the harmonicity and roll-off frequency.

At step 302 the temporal variation of each frequency band of the portion up to the roll-off frequency is determined according to the method previously described. The apparatus detects a strong impulse if the minimum of the temporal variation is greater than a threshold (for example 0.95). This strong impulse indicates the presence of impulsive wind noise in the portion, and the portion is categorised into category 1 above. The method then progresses to step 303. At step 303, frequency dependent gain factors are applied to the signal components in the portion. The gain factors are generated based on the estimated temporal variation values. For example, the gain factors may be set to 0 such that the impulsive wind noise is completely removed. Alternatively, the gain factors may be set to $(1-v_k(l))$, where $v_k(l)$ is the temporal variation as defined in equation 6. If the temporal variation values indicate that impulsive wind noise is not present in the portion, then the method progresses to step 304.

At step 304 the speech absence probability of each frequency band of the portion is determined according to the method previously described. At least one of the speech absence probabilities associated with the portion is compared to a first threshold. Suitably, the first threshold is lower than the second threshold. Suitably, the first threshold is 0.2. Suitably, one of the smallest speech absence probabilities is compared to the first threshold. Preferably, the smallest speech absence probability is compared to the first threshold. If the selected speech absence probability is greater than the first threshold, then this indicates that the signal does not comprise speech. In this case, the portion is categorised into category 2 above, i.e. including non-impulsive wind noise and no speech. The portion then progresses to step 305. At step 305, frequency dependent gain factors are applied to the signal components in the portion. The roll-off frequency is used as a threshold value. Below the roll-off frequency, the gain factors applied to the signal components are much lower than above the roll-off frequency. Consequently, the signal components below the roll-off frequency are more heavily attenuated than signal components above the roll-off frequency. This is advantageous because the wind noise is concentrated below the roll-off frequency, therefore this method targets the signal components comprising wind noise for attenuation.

If the selected speech absence probability is smaller than the first threshold, then this indicates that the signal comprises speech. Suitably, the method then progresses to step 306, where it is determined if the signal comprises voiced speech or unvoiced speech. Speech is voiced if the voice box is used in producing the sound, whereas speech is unvoiced if the voice box is not used in producing the sound. Voiced speech normally has a formant structure, i.e. exhibits high power concentrations at particular frequencies. This is due to resonances in the vocal tract at those frequencies. The formant structure of voiced speech results in it having an uneven distribution of speech absence probability values. It is therefore expected that the highest speech absence probability values of a portion of voiced speech are greater than the highest speech absence probability values of a portion of unvoiced speech.

At step 306 at least one of the speech absence probabilities associated with the portion is compared to a second threshold. Suitably, the second threshold is larger than the first threshold. Suitably, the second threshold is 0.5. Suitably, one of the largest speech absence probabilities is compared to the second threshold. Preferably, the largest speech absence probability is compared to the second threshold. If the selected speech absence probability is greater than the second threshold, then this indicates that the signal comprises unvoiced speech. In this case, the portion is categorised into category 4 above, i.e. including non-impulsive wind noise and unvoiced speech. The portion progresses to step 307. At step 307, frequency dependent gain factors are applied to the signal components in the portion. As in step 305, the roll-off frequency is used as a threshold, below which the signal components are more heavily attenuated.

If the selected speech absence probability is smaller than the second threshold, then this indicates that the signal comprises voiced speech. In this case, the portion is categorised into category 3 above, i.e. including non-impulsive wind noise and voiced speech. The portion progresses to step 308. At step 308, frequency dependent gain factors are applied to the signal components in the portion. As in steps 305 and 307, the roll-off frequency is used as a threshold, below which the signal components are more heavily attenuated.

The gain factors in steps 307 and 308 are generated in dependence on the voicing status (i.e. voiced or unvoiced speech) and the value of the roll-off frequency.

In the presence of wind noise, the lower frequencies of the signal are typically dominated by the wind noise. Wind signal components have high energy at these low frequencies causing the speech absence probabilities of these frequency bands to be low. It is therefore difficult to distinguish between wind noise and speech in the low frequency bands. The high frequencies of the signal are subject to stationary background noise but not a high concentration of wind noise. The speech absence probability values of frequency bands occupying high frequencies (e.g. 2500 Hz-3750 Hz) are therefore used to detect speech in the signal in the presence of wind noise. In other words, the speech absence probability values which are compared to the first and second thresholds in steps 304 and 306 are selected from the speech absence probability values of high frequency bands.

If the roll-off frequency is sufficiently low, indicating that there is wind noise in the signal, then only the speech absence probabilities of frequency bands above the roll-off frequency are determined. These speech absence probabilities are then used as previously described to detect the presence of voiced speech or unvoiced speech.

Suitably, the frequency dependent gain factors applied in steps 305, 307 and 308 are generated by piece-wise linear functions.

Suitably, the gain factor applied in step 305 for non-impulsive wind noise and non-speech is:

$$G(f) = \begin{cases} G_{min} & f \le f_c \\ \dfrac{(\alpha G_{max} - G_{min})(f - f_c)}{(f_h - f_c)} & f_c < f \le f_h \\ G_{max} & \text{otherwise} \end{cases} \qquad \text{(equation 8)}$$

Suitably, the gain factor applied in step 307 for non-impulsive wind noise and unvoiced speech is:

$$G(f) = \begin{cases} G_{min} & f \le f_c \\ \dfrac{(G_{max} - G_{min})(f - f_c)}{f_l - f_c} & f_c < f \le f_l \\ G_{max} & \text{otherwise} \end{cases} \qquad \text{(equation 9)}$$

Suitably, the gain factor applied in step 308 for non-impulsive wind noise and voiced speech is:

$$G(f) = \begin{cases} \dfrac{(G_{max} - G_{min})f}{f_c} & f \le f_c \\ G_{max} & \text{otherwise} \end{cases} \qquad \text{(equation 10)}$$

where f is frequency, $f_c$ is the roll-off frequency, $f_l$ is the low boundary of the frequency range used for detecting speech in the presence of wind, $f_h$ is the high boundary of the frequency range used for detecting speech in the presence of wind, $G_{min}$ is the minimum gain value to be applied (default: 0), $G_{max}$ is the maximum gain value to be applied (default: 1), and $\alpha$ is a constant between 0 and 1 (default: 0.5).

For both non-speech (equation 8) and unvoiced speech (equation 9), a minimum gain value is applied to frequencies less than the roll-off frequency. Typically, this minimum gain value is 0. This is because these frequencies are not expected to include any wanted signal components.

Voiced speech (equation 10) is likely to include speech components in addition to wind noise below the roll-off frequency. Larger gain factors are therefore applied to voiced speech below the roll-off frequency compared to unvoiced speech and non-speech. The gain factor in equation 10 is a weighted difference between $G_{max}$, and $G_{min}$. The weighting is achieved by multiplying the difference by the ratio of the frequency and the roll-off frequency. Thus a gradual increase in the gain applied to the signal as the frequency increases is achieved. Above the roll-off frequency, the maximum gain $G_{max}$ is applied to all frequencies since above this frequency there is limited wind noise to attenuate.

For non-speech (equation 8), the gain values applied to frequencies between the roll-off frequency and the highest frequency used to detect speech (e.g. 3750 Hz), gradually increase as the frequency increases. The gain factor in equation 8 is a weighted difference between a fraction a of $G_{max}$ and $G_{min}$. The weighting is achieved by the ratio of two terms. The first term is the frequency minus the roll-off frequency. The second term is the highest frequency used to detect speech minus the roll-off frequency. For frequencies above the highest frequency used to detect speech, the gain value for non-speech is selected to be $G_{max}$. Since the signal is expected to be predominantly non-speech, greater attenuation factors (i.e. closer to 0) are applied at frequencies below $f_h$ than in signals containing speech. More aggressive attenuation of the wind noise is appropriate since this is not at the cost of potentially losing speech content of the signal.

For unvoiced speech (equation 9), the gain values applied to frequencies between the roll-off frequency and the lowest frequency used to detect speech (e.g. 3750 Hz), gradually increase as the frequency increases. The gain factor in equation 9 is a weighted difference between $G_{max}$ and $G_{min}$. The weighting is achieved by the ratio of two terms. The first term is the frequency minus the roll-off frequency. The second term is the lowest frequency used to detect speech minus the roll-off frequency. For frequencies above the lowest frequency used to detect speech, the gain value for unvoiced speech is selected to be $G_{max}$. Unvoiced speech components are more concentrated at higher frequencies compared to voiced speech components. Consequently greater attenuation factors (i.e. closer to 0) are applied to frequencies below $f_h$ than are applied for voiced speech signals.

At step 309, the signal components are combined to form the reconstructed signal.

The described method determines a roll-off frequency. This roll-off frequency is advantageously used to both detect the presence of wind noise in the signal, and also to control the gain factors applied to signals in the presence of wind noise. For signals determined to include non-impulsive wind noise, the gain factors applied to frequencies below the roll-off frequency are much lower than the gain factors applied to frequencies above the roll-off frequency. Since the roll-off frequency is specific to the portion of the signal being processed, the attenuation below the roll-off frequency is tailored specifically for the wind noise detected in that portion. The described method thereby addresses the problem of the wind noise in the signal exhibiting a changing spectral pattern, for example as a result of the speed of the wind changing. If the wind noise is at a lower speed then the roll-off frequency will be lower (since the power-frequency distribution is skewed at low speeds), and hence the attenuation will be applied more heavily to low frequencies below this low roll-off frequency. On the other hand, if the wind noise is at a higher speed, then the roll-off frequency will be higher (since the power-frequency distribution is flatter at higher speeds), and hence the attenuation will be applied more heavily to frequencies below this high roll-off frequency.

An alternative, simpler implementation to the example implementation described herein will now be described. The roll-off frequency of the voice signal is determined. If the roll-off frequency is determined to be lower than a threshold value then the voice signal is identified as comprising wind noise in the same manner as previously described. In this implementation, however, the gain factors are not generated in dependence on the temporal variation and speech absence probability values. The particular type of wind (i.e. impulsive or non-impulsive) and speech (i.e. non-speech, voiced or unvoiced) is not determined. Instead, the roll-off frequency is used directly to generate gain factors for the voice signal. Low attenuation factors (i.e. close to 1) are applied to signal components at frequencies greater than the roll-off frequency. Higher attenuation factors (i.e. closer to 0) are applied to signal components at frequencies lower than the roll-off frequency. Since the wind noise is concentrated at frequencies lower than the roll-off frequency, this method achieves selective suppression of the wind noise. This method is preferable to the systems described in the background to this disclosure that apply attenuation in fixed frequency bands in dependence on the wind detection, because these methods do not account for different spectral patterns of wind noise, for example at different wind speeds. The method described does account for the different spectral patterns of wind noise at different wind speeds in the manner described in the previous paragraph.

The method described herein achieves effective suppression of wind noise whilst being low in computational complexity. Accordingly, the method is suitable for use on embedded platforms such as Bluetooth headsets, mobile phones, and hearing aids.

Advantageously, the described methods are suitable for implementation in real-time.

The method described herein determines individual temporal variation values for each frequency band of a portion. This is advantageous because it enables frequency dependent gains to be generated using the temporal variation values. For example, the gain factor applied to a particular frequency band may be 1 minus the temporal variation value determined for that frequency band. Consequently, the frequency dependent gains are tailored such that higher attenuation factors are applied to frequency bands in which the impulsive noise is detected.

The calculations performed are lower in computational complexity than those described in the background section to this disclosure. Additionally, the method uses the upper frequency limit (roll-off frequency) to limit the number of calculations performed. For example, the temporal variation is only calculated for frequency bands up to the roll-off frequency. This limits the number of calculations performed and hence reduces the computational complexity associated with the noise suppression analysis. Additionally, some steps in the described method are likely to have been calculated in a conventional noise suppression system for other purposes, for example the harmonicity. The use of such steps in this method does not therefore incur additional computational complexity.

The described method is suitable for use as a single channel wind noise suppression algorithm. The method may also be integrated into multiple-microphone systems. For example, it can be used as a pre-processor or a post-processor in a multi-channel system. For example, the wind noise suppression method described herein can be used in addition to a known noise suppression method (designed to predominantly suppress quasi-stationary noise). The known noise suppression method generates gain values for each frequency band. These gain values are multiplied by the corresponding gain values determined in the method described herein to form total gain values. Preferably, the total gain values are smoothed before they are applied to the input signal.

If the wind noise suppression apparatus described herein is used in a standalone mode, then the gain values are preferably smoothed before being applied to the input signal.

Figure 4:
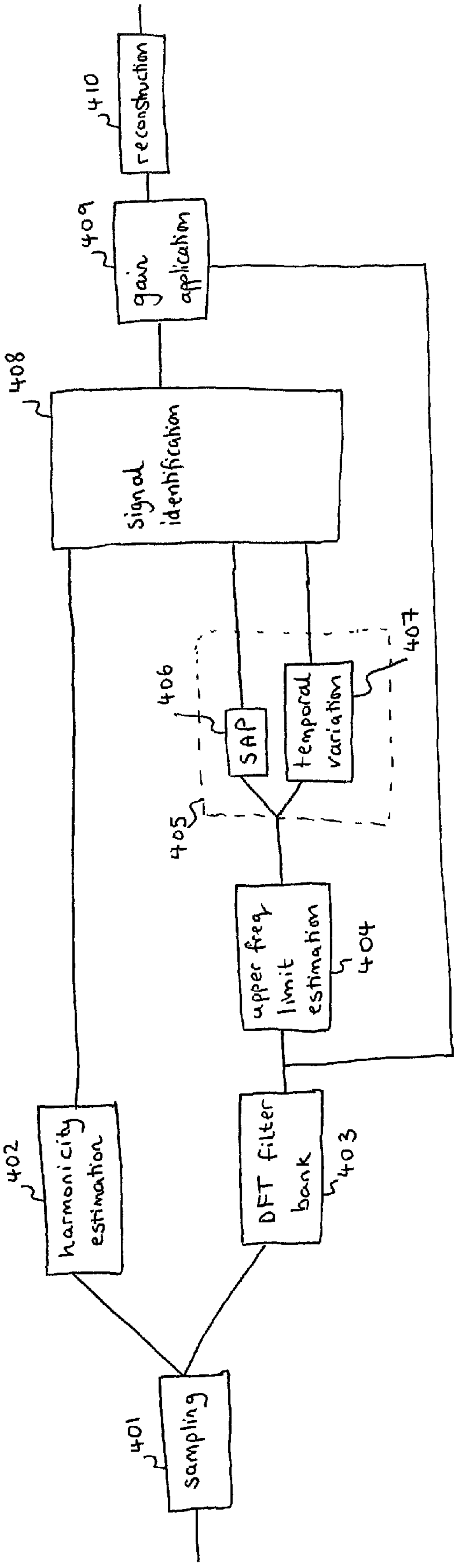
FIG. 4 illustrates a schematic diagram of a signal processing apparatus according to the present disclosure.

FIG. 4 illustrates an example logical architecture for the wind noise mitigation method described. A voice signal is applied to sampling module 401 where it is sampled and segmented into portions for further analysis. The harmonicity of each portion is estimated at the harmonicity estimation module 402 as described herein. Each portion is converted from the time domain to the frequency domain at the DFT filter bank 403. The output of the filter bank is applied to an upper frequency limit estimation module 404 where the upper frequency limit is estimated in accordance with the method described herein. The output of the upper frequency limit estimation module is applied to the comparison module 405 which comprises a speech absence probability module 406 and a temporal variation module 407. These modules determine the speech absence probabilities and temporal variations of the frequency bands of the portion as described herein. The output of the comparison module and the output of the harmonicity estimation module are applied to the signal identification module 408. The signal identification module uses the information input to it to determine whether the portion comprises clean speech, impulsive wind noise, non-impulsive wind noise, non-impulsive wind noise mixed with voiced speech or non-impulsive wind noise mixed with unvoiced speech. The signal identification outputs its analysis to the gain application module 409 which applies frequency dependent gains to the signal components of the portion in dependence on the category of noise/speech in the portion as determined by the signal identification module. The gain application module 409 outputs the modified signal components to the reconstruction module 410 where the voice signal is reconstructed. The resulting reconstructed voice signal has substantially reduced wind noise signal components compared to the voice signal input to the apparatus.

The system described above could be implemented in dedicated hardware or by means of software running on a microprocessor. The system is preferably implemented on a single integrated circuit.

As described above, the apparatus described can be used as a standalone system or an add-on module to existing stationary noise suppression systems.

Figure 5:
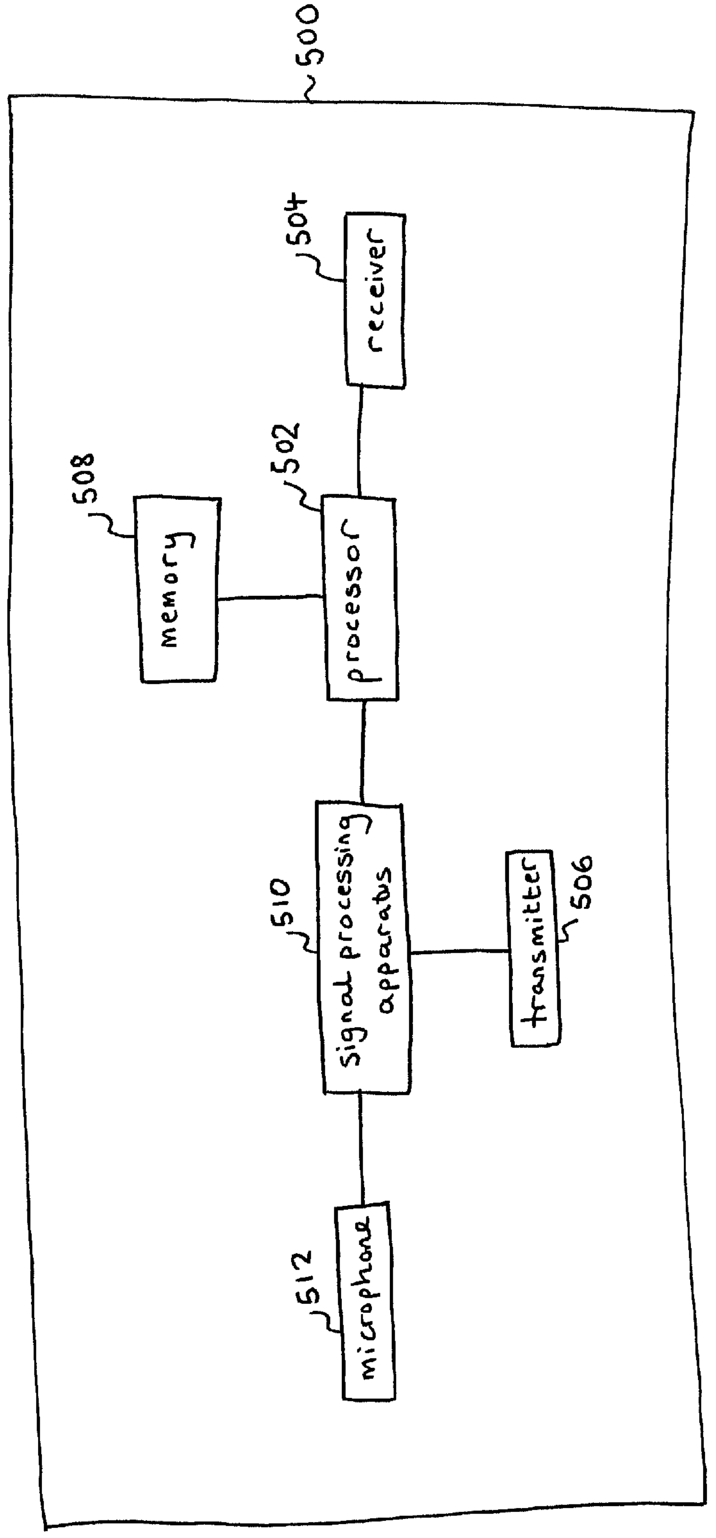
FIG. 5 illustrates a schematic diagram of a transceiver suitable for comprising the signal processing apparatus of FIG. 4.

The noise suppression apparatus of FIG. 4 could usefully be implemented in a transceiver. FIG. 5 illustrates such a transceiver 500. A processor 502 is connected to a transmitter 506, a receiver 504, a memory 508 and a signal processing apparatus 510. The signal processing apparatus is further connected to microphone 512. Any suitable transmitter, receiver, memory, microphone and processor known to a person skilled in the art could be implemented in the transceiver. Preferably, the signal processing apparatus 510 comprises the apparatus of FIG. 4. Suitably, the signal processing apparatus comprises further noise suppression apparatus for suppressing quasi-stationary background noise. The signal processing apparatus is additionally connected to the transmitter 506. The signals picked up by the microphone 512, are passed directly to the signal processing apparatus for processing as described herein. After processing, the wind noise suppressed signals may be passed directly to the transmitter for transmission over a telecommunications channel. Alternatively, the signals may be stored in memory 508 before being passed to the transmitter for transmission. The transceiver of FIG. 5 could suitably be implemented as a wireless telecommunications device. Examples of such wireless telecommunications devices include handsets, desktop speakers and handheld mobile phones.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method of suppressing wind noise in a voice signal comprising: determining an upper frequency limit that lies within the frequency spectrum of the voice signal; for each of a plurality of frequency bands below the upper frequency limit, comparing the average power of signal components in a first portion of the signal to the average power of signal components in a second portion of the signal, the second portion being successive to the first portion; identifying signal components in at least one of the plurality of frequency bands as comprising impulsive wind noise in dependence on the comparison; and attenuating the identified signal components; comparing the average power of signal components in the first portion and the average power of signal components in the second portion so as to determine a probability distribution of the temporal variation of the signal as a function of frequency; and identifying signal components as comprising impulsive wind noise in dependence on the probability distribution.

2. A method as claimed in claim 1, comprising determining the upper frequency limit such that a predetermined proportion of the signal power is below the upper frequency limit.

3. A method as claimed in claim 2, wherein the predetermined proportion is selected such that the upper frequency limit is indicative of whether the signal comprises wind noise.

4. A method as claimed in claim 1, further comprising identifying whether the voice signal comprises wind noise in dependence on at least one criterion, and only performing the comparing, identifying signal components and attenuating steps if wind noise is identified.

5. A method as claimed in claim 4, further comprising estimating a harmonicity of the voice signal, wherein a first criterion of the at least one criterion is the estimated harmonicity, wherein the harmonicity being lower than a first threshold is indicative of the voice signal comprising wind noise.

6. A method as claimed in claim 4, wherein a second criterion of the at least one criterion is the determined upper frequency limit, wherein the upper frequency limit being lower than a second threshold is indicative of the voice signal comprising wind noise.

7. A method of suppressing wind noise in a voice signal, the voice signal comprising signal components in a plurality of frequency bands, the method comprising:

for each frequency band, comparing the power of signal components in the frequency band to an estimated background noise power in that frequency band so as to determine a speech absence probability for that frequency band;

comparing at least one of the speech absence probabilities to a first threshold so as to determine a first value indicative of whether the signal comprises wind noise and speech;

comparing at least one of the speech absence probabilities to a second threshold so as to determine a second value indicative of whether the signal comprises voiced speech; and applying a respective gain factor to each frequency band in dependence on the first value and the second value.

8. A method as claimed in claim 7, comprising:

selecting the smallest determined speech absence probability from a subset of the determined speech absence probabilities;

comparing the smallest determined speech absence probability to the first threshold; and determining the first value to indicate that the signal comprises wind noise and speech if the smallest determined speech absence probability is less than the first threshold.

9. A method as claimed in claim 7, comprising:

selecting the largest determined speech absence probability from a subset of the determined speech absence probabilities;

comparing the largest determined speech absence probability to the second threshold; and determining the second value to indicate that the signal comprises voiced speech if the largest determined speech absence probability is greater than the second threshold.

10. A method as claimed in claim 9, further comprising determining the second value to indicate that the signal comprises unvoiced speech if the largest determined speech absence probability is lower than the second threshold.

11. A method as claimed in claim 7, further comprising:

determining an upper frequency limit that lies within the frequency spectrum of the voice signal; and selecting the respective gain factor to apply to each frequency band in dependence on whether the frequency band is below the upper frequency limit.

12. A method as claimed in claim 11, comprising determining the upper frequency limit such that a predetermined proportion of the signal power is below the upper frequency limit.

13. A method as claimed in claim 11, comprising, if the upper frequency limit is below a third threshold, only determining a speech absence probability for each frequency band above the upper frequency limit.

14. A method as claimed in claim 11, further comprising prior to determining the speech absence probabilities:

for each of a plurality of frequency bands below the upper frequency limit, comparing the average power of signal components in a first portion of the signal to the average power of signal components in a second portion of the signal, the second portion being successive to the first portion; and identifying the absence of impulsive wind noise in signal components in the plurality of frequency bands in dependence on the comparison.

15. A method as claimed in claim 11, further comprising identifying whether the voice signal comprises wind noise in dependence on at least one criterion, and only determining a speech absence probability for each frequency band if wind noise is identified.

16. A method as claimed in claim 15, further comprising estimating a harmonicity of the voice signal, wherein a first criterion of the at least one criterion is the estimated harmonicity, wherein the harmonicity being lower than a first threshold is indicative of the voice signal comprising wind noise.

17. A method as claimed in claim 15, wherein a second criterion of the at least one criterion is the determined upper frequency limit, wherein the upper frequency limit being lower than a second threshold is indicative of the voice signal comprising wind noise.

18. An apparatus configured to suppress wind noise in a voice signal comprising: a determination module configured to determine an upper frequency limit that lies within the frequency spectrum of the voice signal; a comparison module configured to, for each of a plurality of frequency bands below the upper frequency limit, compare the average power of signal components in a first portion of the signal to the average power of signal components in a second portion of the signal, the second portion being successive to the first portion; an identification module configured to identify signal components in at least one of the plurality of frequency bands as comprising impulsive wind noise in dependence on the comparison; and a gain module configured to attenuate the identified signal components; and a speech absence probability module configured to, for each frequency band, compare the power of signal components in the frequency band to an estimated background noise power in that frequency band so as to determine a speech absence probability for that frequency band.

19. An apparatus as claimed in claim 18, further comprising a harmonicity estimation module configured to estimate a harmonicity of the voice signal.

20. An apparatus as claimed in claim 19, wherein the comparison module is further configured to:

compare at least one of the speech absence probabilities to a first threshold so as to determine a first value indicative of whether the signal comprises wind noise and speech; and compare at least one of the speech absence probabilities to a second threshold so as to determine a second value indicative of whether the signal comprises voiced speech;

the gain module being further configured to apply a gain factor to each frequency band in dependence on the first and second values.

21. A method of suppressing wind noise in a voice signal comprising: determining an upper frequency limit such that a predetermined proportion of the signal power is below the upper frequency limit; identifying the voice signal as comprising wind noise if the upper frequency limit is less than a threshold; and if the voice signal is identified as comprising wind noise, applying greater attenuation factors to signal components of the voice signal having frequencies below the upper frequency limit than signal components of the voice signal having frequencies above the upper frequency limit; comparing an average power of signal components in a first portion and an average power of signal components in a second portion so as to determine a probability distribution of a temporal variation of the voice signal as a function of frequency; and identifying signal components as comprising impulsive wind noise in dependence on the probability distribution.

* * * * *

UNITED STATES PATENT AND TRADEMARK OFFICE

CERTIFICATE OF CORRECTION

PATENT NO. : 8,600,073 B2
APPLICATION NO. : 12/612505
DATED : December 3, 2013
INVENTOR(S) : Xuejing Sun It is certified that error appears in the above-identified patent and that said Letters Patent is hereby corrected as shown below:

In the Specification

In Column 10, Line 21, delete “speech” and insert -- speech. --, therefor.

In Column 12, Line 59, delete “$f_t$” and insert -- $f_l$ --, therefor.

In Column 13, Line 9, delete “$G_{max}$,” and insert -- $G_{max}$ --, therefor.

In Column 13, Line 20, delete “a of” and insert -- $\alpha$ of --, therefor.

Signed and Sealed this
Twentieth Day of May, 2014

Michelle K. Lee
*Deputy Director of the United States Patent and Trademark Office*